United States Patent [19]
El-Hamamsy et al.

[11] Patent Number: 5,488,269
[45] Date of Patent: Jan. 30, 1996

[54] MULTI-RESONANT BOOST HIGH POWER FACTOR CIRCUIT

[75] Inventors: Sayed-Amr El-Hamamsy; Mustansir H. Kheraluwala, both of Schenectady, N.Y.; David J. Kachmarik, North Olmsted, Ohio

[73] Assignee: General Electric Company, Schenectady, N.Y.

[21] Appl. No.: 386,572

[22] Filed: Feb. 10, 1995

[51] Int. Cl.[6] .................................................. G05F 1/00
[52] U.S. Cl. ........................ 315/307; 315/362; 315/209 R
[58] Field of Search ............................ 315/209 R, 287, 315/DIG. 7, DIG. 4, 291, 362, 224, 307, 308, 360

[56] References Cited

U.S. PATENT DOCUMENTS

| | | |
|---|---|---|
| 4,642,745 | 2/1987 | Stiegerwald et al. . |
| 4,782,268 | 11/1988 | Fahrich et al. .................... 315/200 R |
| 4,808,887 | 2/1989 | Fahnrich et al. . |
| 5,008,597 | 4/1991 | Zuchtriegel ........................ 315/209 R |
| 5,134,556 | 7/1992 | Courier de Mere . |

OTHER PUBLICATIONS

Serial No. 07/934,843, "Power Supply Circuit with Power Factor Correction," L. R. Nerone et al., filed Aug. 25, 1992.
Serial No. 08/386,570, "Variable Frequency Generator For Resonant power Feedback" S-A El-Hamamsy et al., filed Feb. 10, 1995.
"Disturbances in Supply Systems Caused by Household Appliances and Similar Electrical Equipment," British Standard 5406, Part 2, 1988.

*Primary Examiner*—Robert J. Pascal
*Assistant Examiner*—Reginald A. Ratliff
*Attorney, Agent, or Firm*—Jill M. Breedlove; Marvin Snyder

[57] ABSTRACT

A multi-resonant boost power factor correction circuit includes a full-wave rectifier; a high frequency filter capacitance coupled across the input terminals of the full-wave rectifier; a series half-bridge converter; a diode connected between the output of the rectifier and the dc bus voltage such that its cathode is connected to a dc bus; a capacitance coupled between the output of the rectifier and the junction between the series-connected switching devices of the half-bridge converter; a resonant load circuit connected to the junction between the switching devices, including a resonant inductor, a resonant capacitor and a load, such as a fluorescent discharge lamp; and a driver circuit for alternately switching the switching devices via a dead time control for selecting a dead time after one of the devices switches off and the other device switches on. The multi-resonant boost high power factor circuit meets the IEC standard for low harmonic content on input current, thus operating with a very high power factor, and operates with a minimal number of circuit components. In addition, the circuit meets lamp current crest factor specifications for fluorescent discharge lamp ballasts and requires lower voltage power devices.

14 Claims, 7 Drawing Sheets

MULTI-RESONANT BOOST HIGH POWER FACTOR CIRCUIT

FIELD OF THE INVENTION

The present invention relates generally to power factor correction circuits and, more particularly, to a high power factor circuit suitable for a discharge lamp ballast that is compatible with European line voltages and meets European requirements for input current harmonic distortion.

BACKGROUND OF THE INVENTION

International Electrotechnical Commission standards (IEC 555-2) set forth permissible harmonic content which may be fed back into a power system. As such, in Europe, IEC 555-2 specifications require a ballast that draws more than 25 W to meet very stringent input current harmonic distortion standards. The harmonic content of the input current also determines the power factor of the circuit, i.e., the input power divided by the product of the rms voltage and rms current. Furthermore, to meet industry requirements for efficiency and length of lamp life, the lamp current crest factor, i.e., the ratio of the peak lamp current to its rms value, must be less than 1.7. Unfortunately, the power factor and crest factor requirements tend to conflict with each other, especially in low cost circuits.

An integrated boost circuit that meets the IEC 555-2 specifications is described in U.S. patent application Ser. No. 07/934,843 of L. R. Nerone and D. J. Kachmarik, filed Aug. 25, 1992 and assigned to the instant assignee. The integrated boost circuit is used for powering a load with bi-directional current and comprises a full-wave rectifier, a series half-bridge converter, and a boost converter. The series half-bridge converter includes a first switch interposed between the bus conductor and a bridge-switch end of the load circuit; a second switch interposed between a ground conductor and the bridge-switch end of the load circuit; and a switching control circuit for alternately switching on the first and second switches. The boost converter comprises a boost capacitor connected between the bus and ground conductors, the level of charge on the boost capacitor determining the bus voltage on the bus conductor; a boost inductor connected by a one-way valve to the boost capacitor for discharging its energy into the boost capacitor; and a low-impedance path for periodically connecting a load end of the boost inductor to the ground conductor, thereby charging the boost inductor.

Advantageously, the integrated boost circuit meets the IEC and crest factor requirements for a fluorescent discharge lamp ballast; however, it requires a bus voltage approximately twice the peak line voltage. Since rectification of the 230 V European line voltage is 325 V, voltage doubling results in a device stress of 650 V, requiring a 800 V power MOSFET.

In recent years, other high power factor circuits have been proposed, including circuits described in: Steigerwald et al. U.S. Pat. No. 4,642,745; Fahnrich et al. U.S. Pat. No. 4,782,268; Fahnrich et al. U.S. Pat. No. 4,808,887; and Zuchtriegel U.S. Pat. No. 5,008,597. In general, the power factor correction circuits of these patents attempt to draw current from the line during the low voltage periods by connecting a number of capacitors and/or inductors between the high frequency circuit and the line via some diodes. An electrolytic capacitor gets charged by a pumping action of these components. The amount of energy stored in the electrolytic capacitor is proportional at every instant to the value of the input ac line voltage. The average current being drawn from the line is also proportional to the voltage. Therefore, the input power factor is very high and the harmonic content of the current is very low. Most of these circuits require a relatively large number of components.

Accordingly, it is desirable to provide a power circuit that meets worldwide input power factor and input current harmonic specifications. Furthermore, it is desirable to provide an economical power factor correction circuit for fluorescent lamp ballasts while meeting lamp current crest factor specifications with a minimal number of components, and without requiring high voltage power devices.

SUMMARY OF THE INVENTION

A multi-resonant boost power factor correction circuit according to the present invention comprises: a full-wave rectifier for receiving an ac line current and supplying a dc bus voltage from an ac line voltage; a high frequency filter capacitance coupled across the input terminals of the full-wave rectifier; a series half-bridge converter for impressing a voltage which pulsates between ground potential and the dc bus voltage; a diode connected between the output of the rectifier and the dc bus voltage such that its cathode is connected to the dc bus; a capacitance coupled between the output of the rectifier and the junction between the series-connected switching devices of the half-bridge converter; a resonant load circuit connected to the junction between the switching devices, including a resonant inductor in series with a dc blocking capacitor and the parallel combination of a resonant capacitor and a load, such as a fluorescent discharge lamp; and a driver circuit for alternately switching the switching devices with a predetermined dead time during which both devices are off after one of the devices switches off and the other device switches on.

Advantageously, the multi-resonant boost high power factor circuit meets the IEC standard for low harmonic content on input current, thus operating with a very high power factor. Moreover, the high power factor circuit of the present invention operates with a minimal number of circuit components. In addition, the high power factor circuit meets lamp current crest factor specifications for fluorescent discharge lamp ballasts and requires lower voltage power devices than prior art fluorescent discharge lamp ballasts.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 6:
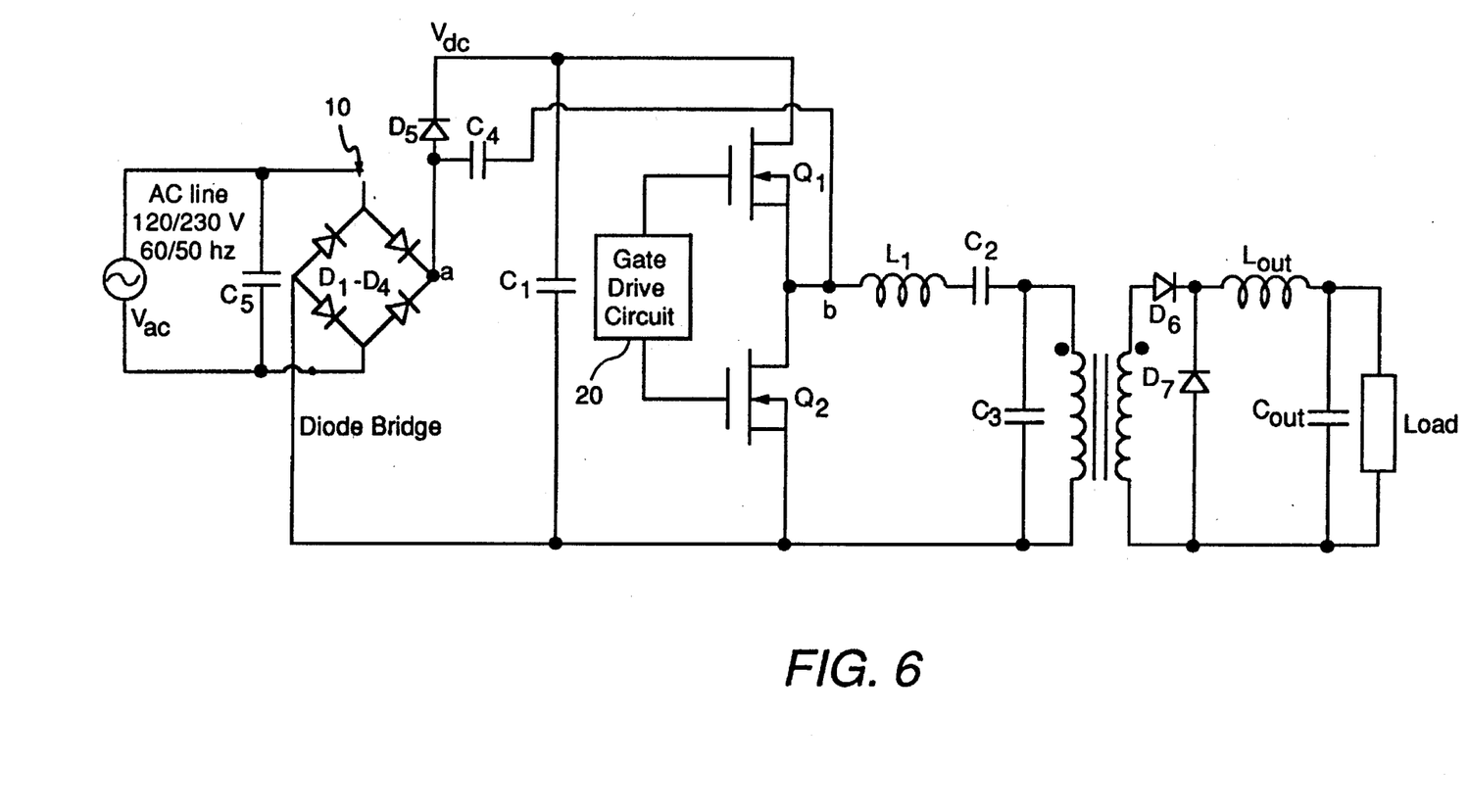
FIG. 6 schematically illustrates the high power factor circuit of the present invention in an off-line dc power supply circuit.

The high power factor circuit of the present invention is described herein with reference to a discharge lamp ballast. However, the principles of the present invention are not limited to discharge lamp ballasts, but can be used in other applications, such as, for example, an off-line dc power supply, as illustrated in FIG. 6 and described hereinbelow.

Figure 1:
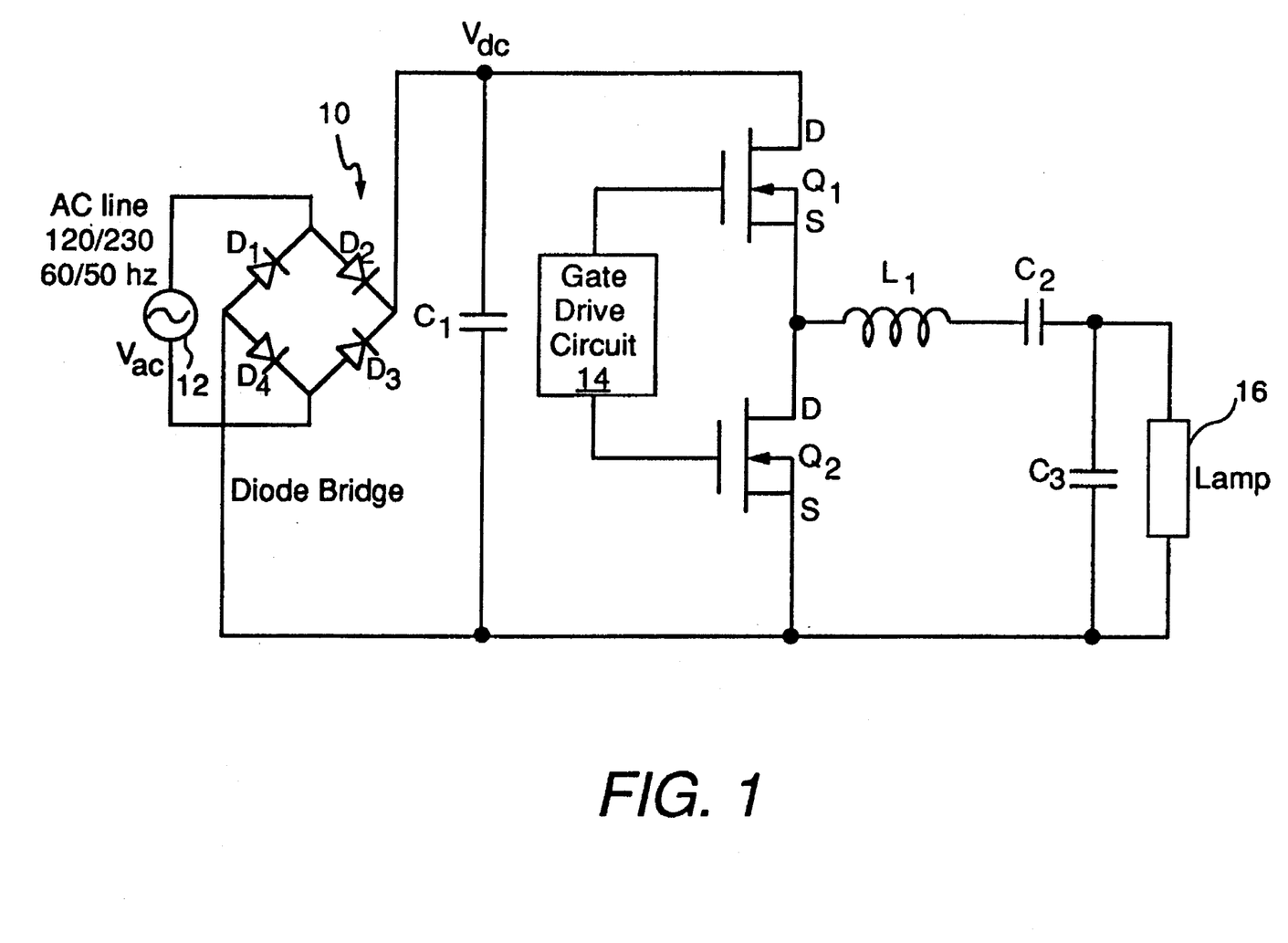
FIG. 1 schematically illustrates a conventional ballast for a fluorescent discharge lamp.

FIG. 1 illustrates a conventional half-bridge ballast configuration for a fluorescent lamp. The ballast of FIG. 1 includes a full-wave rectifier 10, shown as comprising diodes $D_1$–$D_4$, for rectifying an ac voltage $V_{ac}$ supplied from a source 12. A capacitor $C_1$, typically electrolytic, is coupled across the rectifier output, thereby providing a rectified, filtered voltage $V_{dc}$ to a half-bridge connection of switching devices $Q_1$ and $Q_2$. A gate drive circuit 14 is provided for alternately switching $Q_1$ and $Q_2$ to provide bi-directional current flow through a resonant load circuit, including a series connection of a resonant inductor $L_1$, a dc blocking capacitor $C_2$ and a resonant capacitor $C_3$. A load 16, illustrated as a fluorescent discharge lamp, is connected in parallel with resonant capacitor $C_3$.

Disadvantageously, the circuit of FIG. 1 introduces a relatively high proportion of input frequency harmonics into the input current, resulting in a low power factor, so that IEC standards are not met.

In accordance with the present invention, a high power factor circuit is provided which advantageously meets the IEC standards for low harmonic content with a minimal number of circuit components. Additionally, the high power factor circuit is compatible with European and American voltages, while meeting lamp current crest factor specifications for discharge lamp ballasts, thereby providing high lamp efficiency and a long lamp life.

The present invention is an improvement over the prior art circuits of U.S. Pat. Nos. 4,782,268; 4,808,807; and 5,008,597, cited hereinabove, because the above-enumerated advantages are met with fewer circuit components, and hence a practical high power factor circuit suitable for fluorescent discharge lamp ballasts. In addition, relative to the integrated boost circuit, the present invention uses lower voltage power devices. The present circuit structure in combination with appropriate dead-time selection not only results in fewer circuit components, but allows for any of the standard modes of driving ballasts: self-oscillating, fixed frequency, and variable frequency controlled by current or voltage feedback.

Figure 2:
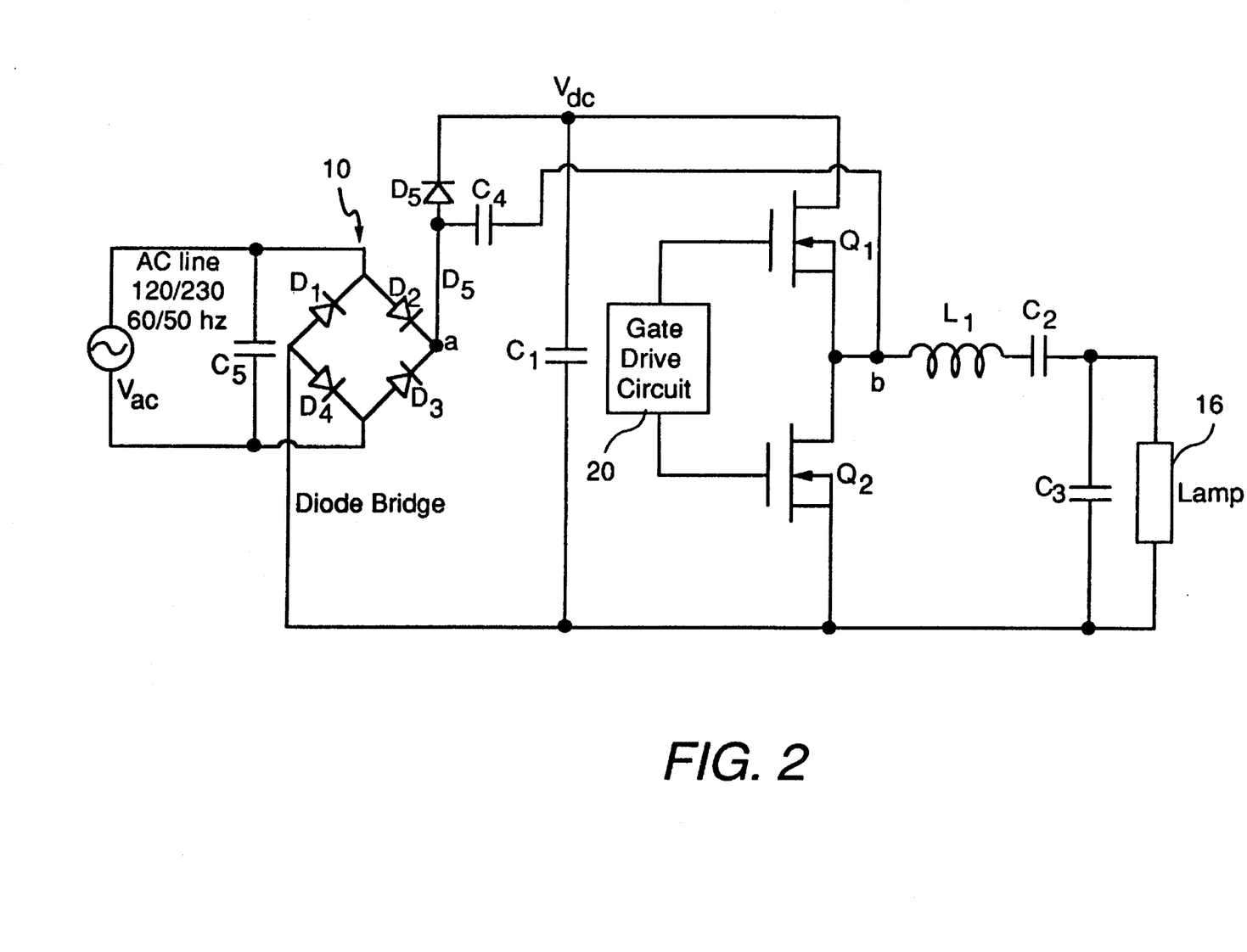
FIG. 2 schematically illustrates a high power factor circuit according to the present invention.

FIG. 2 illustrates a multi-resonant boost high power factor circuit according to the present invention. In FIG. 2, reference numerals corresponding to like elements in FIG. 1 are the same. According to the present invention, high power factor and lamp current crest factor specifications are met by the following: connecting a high-frequency filter capacitor $C_5$ across the input terminals of the diode bridge rectifier; connecting a capacitor $C_4$ between the output node a of the full-wave rectifier 10 and the junction b joining switching devices $Q_1$ and $Q_2$; connecting a one-way electrical valve, e.g., a diode $D_5$, between node a and the drain terminal of upper switching device $Q_1$; and by using a gate drive circuit 20 with appropriate dead-time selection.

Figure 3A:
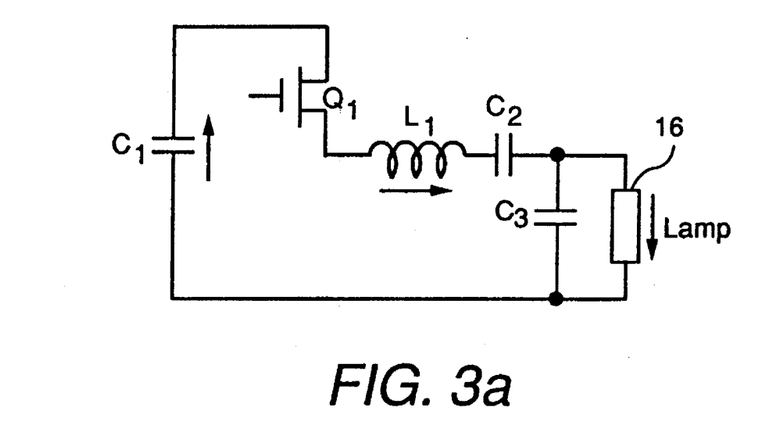
FIGS. 3a–3f schematically illustrate equivalent configurations of the high power factor circuit of FIG. 2 during a switching cycle thereof.

Operation of the high power factor circuit of FIG. 2 is illustrated by the equivalent circuits of FIGS. 3a–3f during six time intervals of a single switching cycle of switching devices $Q_1$ and $Q_2$. FIG. 3a shows operation of the circuit in the first time interval initiated when switch $Q_1$ is turned on and with switch $Q_2$ off, such that current flows out of electrolytic capacitor $C_1$ and into inductor $L_1$ and capacitor $C_2$ and the parallel combination of $C_3$ and the lamp in the direction shown. Energy is being drawn from capacitor $C_1$. (If the voltage across capacitor $C_1$ were higher than the line voltage, then all diodes $D_1$–$D_5$ would be reverse biased and would not conduct.)

Figure 3B:
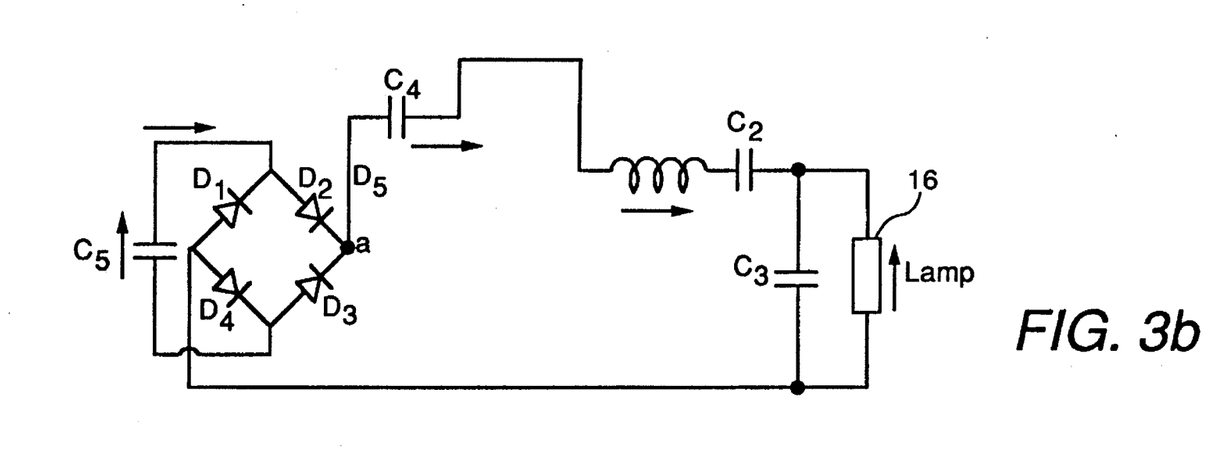

FIG. 3b illustrates operation during a dead time interval just after switch $Q_1$ has been turned off (switch $Q_2$ still off). With a specifically selected load phase angle (i.e., the angle between the inductor current and the fundamental component of the midpoint voltage as determined by design values of capacitor $C_3$, inductor $L_1$ and capacitor $C_2$ in addition to the lamp resistance), the inductor current continues flowing in the same direction as in FIG. 3a. The current almost entirely flows through capacitor $C_4$, with a small amount of current flowing through the output capacitances (not shown) of switches $Q_1$ and $Q_2$. With the value of capacitor $C_5$ chosen so that $C_5$ functions as a filtering component at the switching frequency, the switching frequency harmonics of the current flow through capacitor $C_5$. Capacitor $C_4$ charges to the instantaneous rectified line voltage. If the dead time has not ended at that moment, then the diodes in the bridge and diode $D_5$ become reverse biased.

Figure 3C:
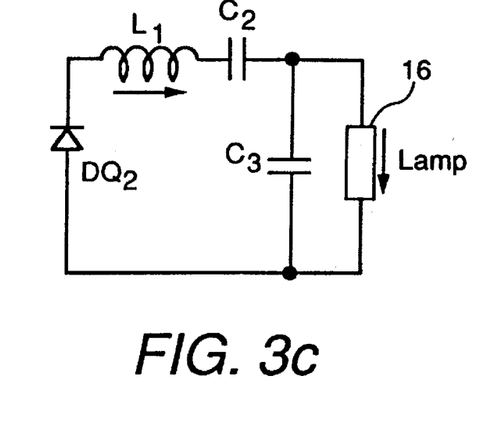
Figures 3D, 3E, 3F:
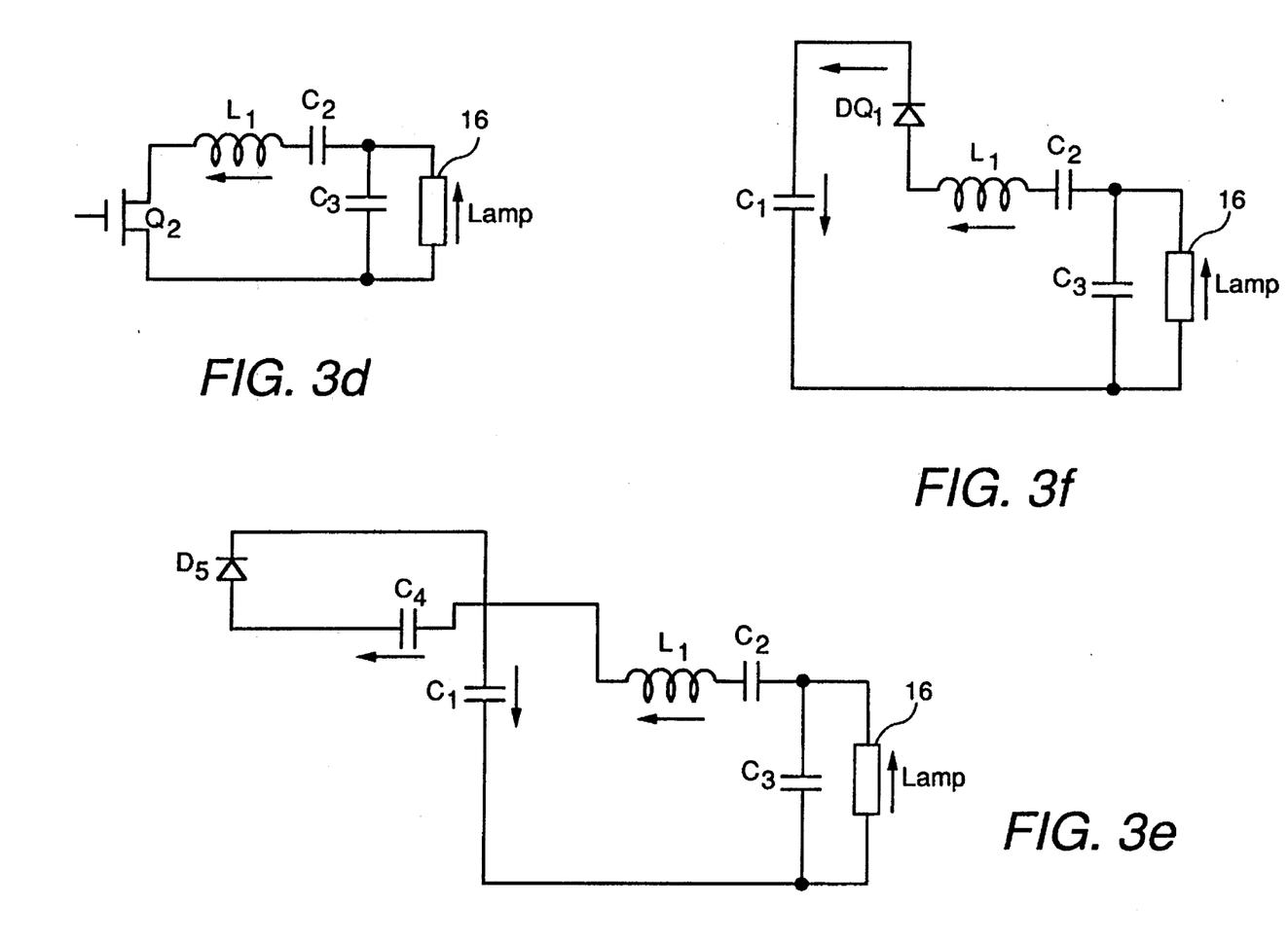

FIG. 3c illustrates operation during the remaining time of the dead time interval during which the body diode of device $Q_2$ conducts. The inductor current flows through the body diode of $Q_2$, represented as $DQ_2$, until the current reverses direction or the dead time ends. If the dead time ends before the current in inductor $L_1$ reverses direction, the current will continue to flow in the same direction through the channel of device $Q_2$ at the beginning of the next time interval (FIG. 3d). Note that the dead time should be optimized for this mode of operation so that the dead time ends before current in inductor $L_1$ reverses direction.

FIG. 3d illustrates the time interval initiated when switch $Q_2$ is turned on and switch $Q_1$ is off. Once switch $Q_2$ is on, the current in resonant inductor $L_1$ flows through the channel of switch $Q_2$ and the lamp. No energy is drawn from capacitor $C_1$ during this time interval. The current is shown flowing from the drain of device $Q_2$ to the source of $Q_2$; however, as mentioned hereinabove, the current could flow in the opposite direction at the beginning of the cycle.

FIG. 3e illustrates operation during a second dead time interval just after switch $Q_2$ is turned off (switch $Q_1$ still off). Most of the current in inductor $L_1$, except for a small fraction, which flows through the output capacitances (not shown) of devices $Q_1$ and $Q_2$, continues flowing through capacitor $C_4$ into diode $D_5$ and into capacitor $C_1$ and the load. The energy stored in capacitor $C_4$ gets transferred into capacitor $C_1$, charging $C_1$. When capacitor $C_4$ is fully discharged, the current in inductor $L_2$ continues flowing in the reverse body diode of device $Q_1$ and continues to store some energy in capacitor $C_1$. If the dead time is too short and capacitor $C_4$ does not get fully discharged, a discharge current spike will flow through device $Q_1$ at the beginning of the next time interval. This condition increases the losses in the circuit and is avoided by proper selection of capacitor $C_4$, inductor $L_2$ and the dead time.

FIG. 3f illustrates operation during the remaining time of the second dead time interval during which the body diode of device $Q_1$ conducts. This completes a switching cycle, with the next mode being that illustrated by FIG. 3a.

Figure 4:
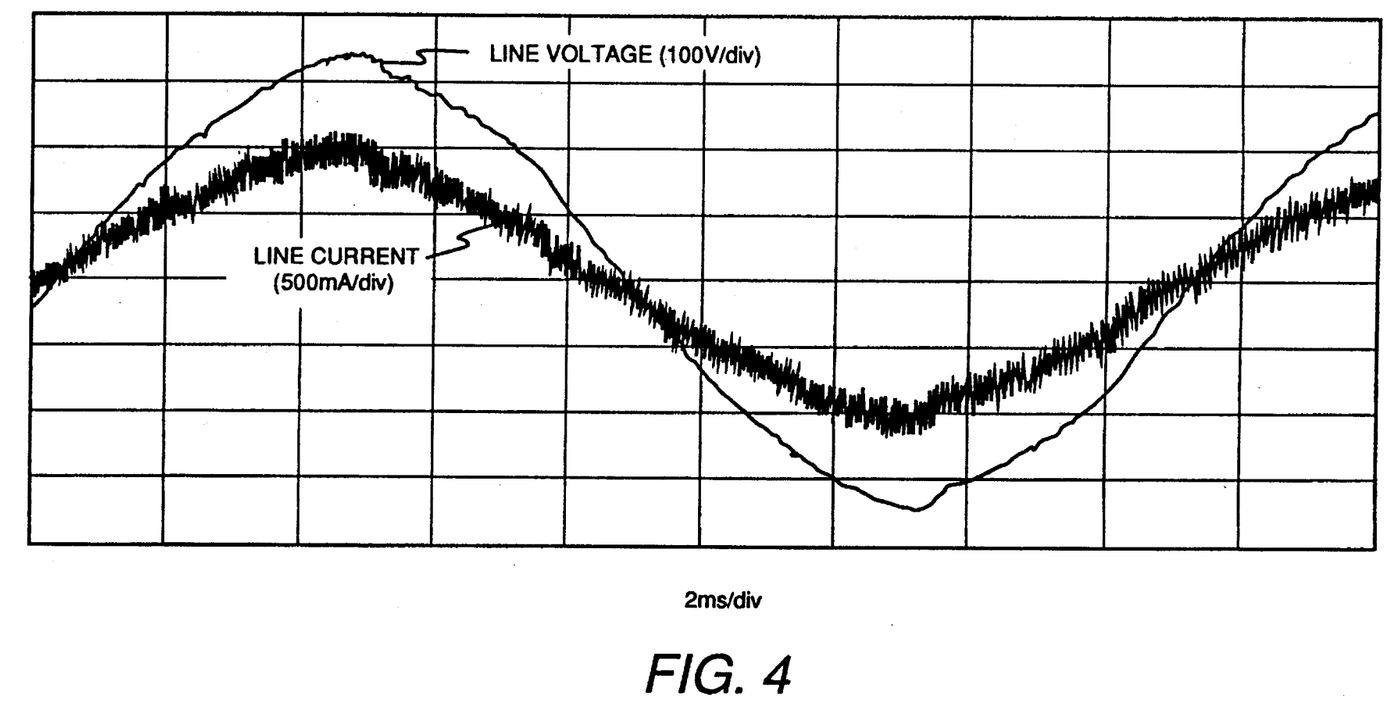
FIG. 4 graphically illustrates the line voltage and line current resulting from operation of the high power factor circuit of FIG. 2.

Power factor correction occurs when the energy drawn by the circuit from the ac line during each portion of the switching cycle summed over the whole ac line cycle is equal to the energy consumed in the circuit during the whole line cycle, i.e., the sum of the energy delivered to the load and the energy dissipated as losses. When this condition is maintained, the voltage across capacitor $C_1$ remains higher than the line voltage at all times and there is no peak charging current drawn from the line. As a result, the line current (after high frequency filtering by capacitor $C_5$) is an image of the input voltage and is in phase with it, as illustrated by the waveforms of FIG. 4.

Figure 5:
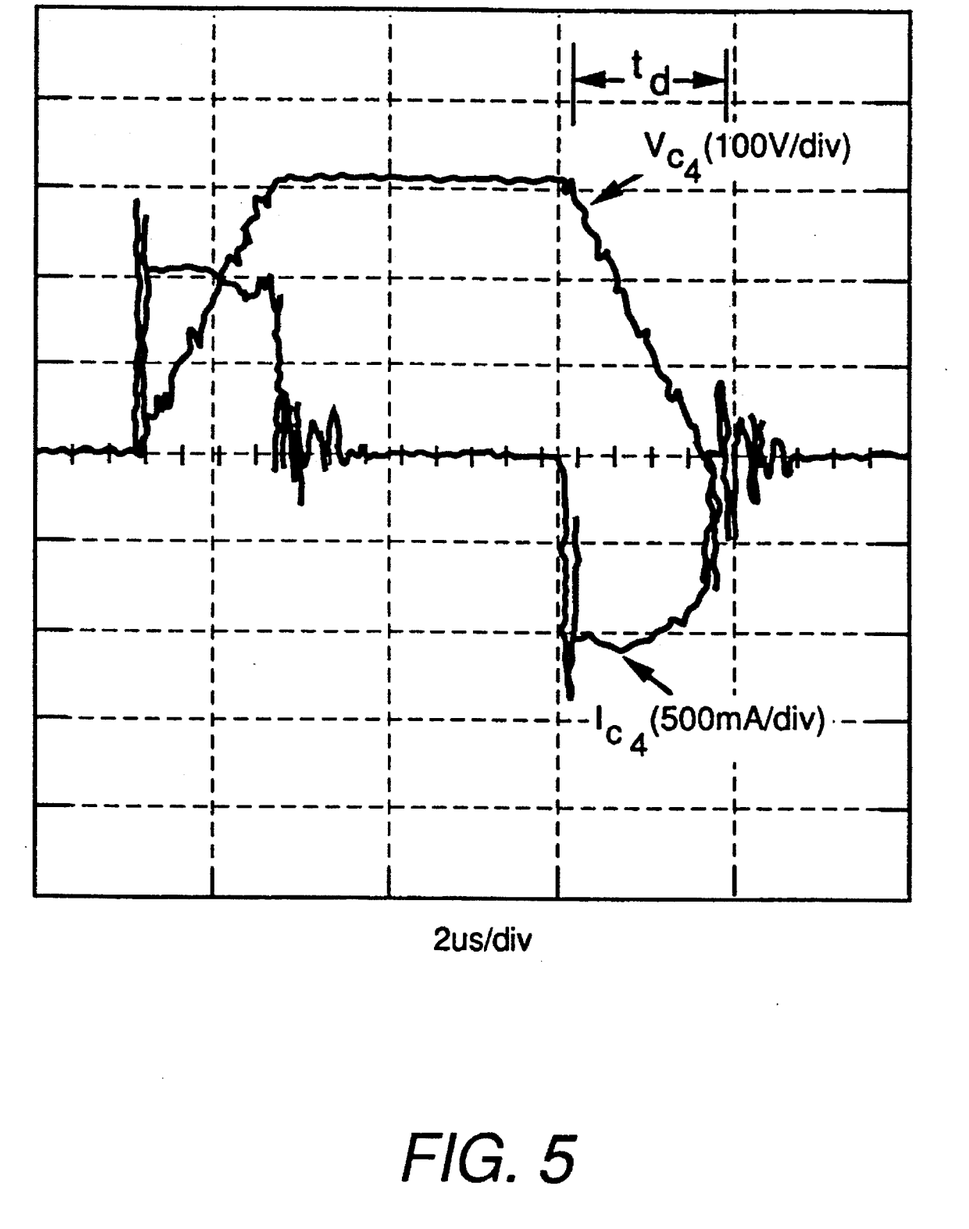
FIG. 5 graphically illustrates the current and voltage waveforms for capacitor $C_4$ of FIG. 2 during operation thereof.

FIG. 5 graphically illustrates the voltage and capacitor waveforms for capacitor $C_4$ during the six time intervals described hereinabove with reference to FIGS. 3a–3f. In FIG. 5, the dead time is represented by $t_d$.

The design equations used to calculate the component values are derived as follows. First, to achieve high power factor, the energy stored in capacitor $C_4$ during a full line cycle (50 or 60 Hz) has to be equal to half the energy being drawn by the circuit:

$$\frac{1}{2} V_{ac}^2 C_4 \frac{f_s}{f_l} = \frac{1}{2} \frac{P_{tot}}{f_l}$$

which results in the following:

$$V_{ac}^2 C_4 f_s = P_{tot}$$

where $V_{ac}$ is the rms line voltage, $f_s$ is the switching frequency, $f_l$ is the line frequency, and $P_{tot}$ is the sum of the power delivered to the load and the losses in the circuit.

In addition to the condition given by the above equation, the voltage $V_{dc}$ across capacitor C1 must be greater than the peak line voltage $\sqrt{2}V_{ac}$ to avoid a capacitor charging current spike at the peak of the line voltage. The percentage increase of $V_{dc}$ over the peak rectified line is an independent parameter selected in consideration of device stresses and load conditions, e.g., a value of $V_{dc}$ equal to 1.05 times the peak line voltage.

The total power is then given by the following:

$$P_{tot} = \frac{I_L V_{dc} V_f}{2} \cos(\Phi_L)$$

where $I_L$ is the peak load current, $V_f$ is the fundamental component of the voltage at point b (multiplied by $V_{dc}$ to give the amplitude of the fundamental voltage) and $\phi_L$ is the load phase angle. Finally, in order for the circuit to operate at high efficiency all the energy stored in capacitor $C_4$ must be discharged during the dead time, which means that:

$$\sqrt{2} V_{ac} = \frac{I_L}{\omega_s C_4} 2\sin(\Phi_d)\sin(\Phi_L)$$

where $\phi_d$ is equal to the angle corresponding to half the dead time ($\phi_d = t_d f_s 180°$) and $\omega_s$ is the switching frequency in radians/sec. The known quantities in the above equations are the input voltage $V_{ac}$, the switching frequency $f_s$, the total power and the dead time $t_d$. The unknown quantities are the load phase angle, the load current and the boost capacitor $C_4$. Solving the equations simultaneously gives the following equation for $\phi_L$:

$$\Phi_L = \arctan\left(\frac{V_{dc}V_f \pi}{\sqrt{2} V_{ac}\sin(\Phi_d)}\right)$$

In the common situation where the midpoint voltage is a trapezoidal waveform $V_f$ is:

$$V_f = \frac{2\sin(\Phi_d)}{\pi \Phi_d}$$

and the equation for $\phi_L$ simplifies to:

$$\Phi_L = \arctan\left(\frac{\sqrt{(2)} V_{dc}}{V_{ac}\Phi_d}\right)$$

As a result of zero-voltage switching, the losses in the circuit are conduction losses in the power devices and in the components. These losses can be represented by a resistor $R_{ref}$ through which the load current flows. Thus, the total power is given by:

$$P_{tot} = P_{out} + \frac{I_L^2}{2} R_{eff}$$

Replacing $P_{tot}$ with the above expression, the load current $I_L$ can be expressed as a function of $\phi_L$ from the following equation:

$$I_L = \frac{V_f V_{dc}\cos(\Phi_L)}{2R_{eff}} \left[1 - \sqrt{1 - \frac{8R_{eff}P_{out}}{(V_f V_{dc}\cos(\Phi_L))^2}}\right]$$

Finally, the value of the high power factor correction capacitor $C_4$ can be obtained as follows:

$$C_4 = \frac{P_{out} + \frac{I_L^2}{2} R_{eff}}{V_{ac}^2 f_s}$$

The impedance of the load seen at point b can now be calculated from the power and the load current. The resistance of the lamp at the operating power is known and from that the values of the inductor $L_1$ and the parallel capacitor $C_3$ can be obtained. For a lamp with a resistance equal to 410Ω at a power of 26.5 W, a switching frequency of 100 kHz and a dead time of 1.67 μsec, the component values are as follows: $L_1$= 497 μH, $C_4$=5.6 nF, $C_1$=10 μF, $C_3$=11.8 nF, $C_2$=0.1 μF; and the results are a power factor pf>0.99, a total harmonic distortion THD<10%, a lamp current crest factor ccf<1.5, and an efficiency greater than 88%.

A high power factor circuit according to the present invention can be driven in any of the standard modes of driving ballasts: self-oscillating, fixed frequency, and variable frequency controlled by current or voltage feedback. The lamp current is modulated by the double line frequency ripple on the energy storage capacitor C1. If the energy storage capacitor C1 is large enough, the lamp current crest factor requirement is met without any feedback control. However, for some applications, such as, for example, where ballast size restrictions in compact fluorescent lamp applications limit the value of the energy storage capacitor C1, current or voltage feedback schemes are required. Although other well-known feedback schemes can be used, one suitable feedback scheme is described in commonly assigned U.S. patent application No. (docket no. RD-23,825) of S.-A. El-Hamamsy and M. H. Kheraluwala, filed concurrently herewith and incorporated by reference herein.

The feedback scheme of U.S. patent application No. (docket no. RD-23,825) involves a fixed duty ratio, variable frequency, square wave generator comprising an astable multivibrator including a pair of resistors coupled in series between a supply voltage terminal and a capacitor, such as of a type implemented with a 555 timer, and further comprising a JFET connected between the capacitor and ground. In a current-controlled version, the anode of a diode is connected to the gate of the JFET, and the cathode of the diode is connected to a sensing resistor for sensing current in a load connected thereto. Alternatively, a voltage sensor for sensing voltage across the load is used in a voltage-controlled system. The multivibrator generates a ramp voltage across the capacitor which varies between predetermined fractions of the supply voltage with a fixed duty ratio. The JFET has a channel resistance which varies with input voltage thereto. The capacitor of the multivibrator charges and discharges through the series connection of the resistors and the JFET channel resistance with charging and discharging times that vary with the input voltage to the JFET. In another embodiment, a resistor is coupled across the drain and source terminals of the JFET for limiting the maximum frequency of the square wave generator.

As mentioned hereinabove, the application of the high power factor circuit of the present invention has been illustrated for use in a fluorescent lamp ballast by way of example only; the principles of the present invention apply to other applications. For example, FIG. 6 schematically illustrates the multi-resonant boost power factor correction circuit in an off-line dc power supply circuit including an output circuit coupled by an isolation transformer to a load. The output circuit is shown as comprising rectifying diodes $D_6$ and $D_7$ and a low pass filter $L_{out}$, $C_{out}$.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power factor correction circuit, comprising:

a rectifier for receiving an ac line current and supplying a dc bus voltage on a dc bus from an ac line voltage, said rectifier having an input and an output;

a high frequency filter coupled at the input of said rectifier, said high frequency filter comprising a filter capacitance;

a half-bridge converter for providing a voltage which pulsates between a reference potential and said dc bus voltage, said half-bridge converter comprising a pair of switching devices connected in series with a junction therebetween;

a one-way electrical valve connected between the output of said rectifier and said dc bus for allowing current flow from said rectifier to said dc bus;

an energy storage capacitance coupled between said dc bus and said reference potential;

a capacitance coupled between the output of said rectifier and the junction between said switching devices;

a resonant load circuit connected to the junction between said switching devices, said resonant load circuit comprising a resonant inductance, a resonant capacitance and a load; and a driver circuit for alternately switching said switching devices, said driver circuit comprising a dead time control circuit for selecting a predetermined dead time after one of said devices switches off and the other of said devices switches on.

2. The power factor correction circuit of claim 1 wherein the values of said dead time, said capacitance coupled between said rectifier and said switching devices, and said resonant inductance are selected such that said dc bus voltage is greater than or equal to said ac line voltage.

3. The power factor correction circuit of claim 1 wherein the values of said dead time, said capacitance coupled between said rectifier and said switching devices, and said resonant inductance are selected such that said capacitance discharges substantially to zero during a dead time of said switching devices to minimize switching losses.

4. The power factor correction circuit of claim 1 wherein said one-way electrical valve comprises a diode having its anode connected to the output terminal of said rectifier and having its cathode connected to said dc bus voltage.

5. The power factor correction circuit of claim 1 wherein said energy storage capacitance comprises an electrolytic capacitor.

6. The power factor correction circuit of claim 1 wherein said resonant capacitance is connected in parallel with said load, and said resonant inductance is connected in series with the parallel connection of said resonant capacitance and said load.

7. The power factor correction circuit of claim 1 wherein said resonant load circuit further comprises a dc blocking capacitance connected in series with said resonant inductance.

8. The power factor correction circuit of claim 1 wherein said load comprises a fluorescent discharge lamp.

9. The power factor correction circuit of claim 7 further comprising a lamp current feedback selected such that said lamp current crest factor is less than approximately 1.7.

10. The power factor correction circuit of claim 1 wherein said driver circuit switches said switching devices at a fixed frequency.

11. The power factor correction circuit of claim 1 wherein said driver circuit switches said switching devices at a variable frequency.

12. The power factor correction circuit of claim 1 said driver circuit switches said switching devices in a self-oscillating mode.

13. The power factor correction of claim 1 wherein said load comprises a power supply output circuit, including a rectifier and a filter, for an off-line dc power supply.

14. A power factor correction circuit, comprising:

a rectifier for receiving an ac line current and supplying a dc bus voltage on a dc bus from an ac line voltage, said rectifier having an input and an output;

a high frequency filter coupled at the input of said rectifier, said high frequency filter comprising a filter capacitance;

a half-bridge converter for providing a voltage which pulsates between a reference potential and said dc bus voltage, said half-bridge converter comprising a pair of switching devices connected in series with a junction therebetween;

a one-way electrical valve connected between the output of said rectifier and said dc bus for allowing current flow from said rectifier to said dc bus;

an energy storage capacitance coupled between said dc bus and said reference potential;

a capacitance coupled between the output of said rectifier and the junction between said switching devices;

a resonant load circuit connected to the junction between said switching devices, said resonant load circuit comprising a resonant inductance, a resonant capacitance and a load; and a driver circuit for alternately switching said switching devices, said driver circuit comprising a dead time control circuit for selecting a dead time after one of said devices switches off and the other of said devices switches on; and a lamp current feedback are selected such that said lamp current crest factor is less than approximately 1.7;

wherein the values of said dead time, said capacitance coupled between said rectifier and said switching devices, and said resonant inductance being selected such that said dc bus voltage is greater than or equal to said ac line voltage and further such that said capacitance discharges substantially to zero during a dead time of said switching devices to minimize switching losses.

* * * * *